United States Patent [19]

Amtower

[11] 4,393,411
[45] Jul. 12, 1983

[54] LASER READ-WRITE SYSTEM FOR THE PRODUCTION OF ENGRAVINGS

[75] Inventor: Richard E. Amtower, Laguna Niguel, Calif.

[73] Assignee: American Hoechst Corporation, Somerville, N.J.

[21] Appl. No.: 758,250

[22] Filed: Jan. 10, 1977

Related U.S. Application Data

[63] Continuation of Ser. No. 522,103, Nov. 8, 1974, abandoned.

[51] Int. Cl.³ .............................................. H04N 1/42
[52] U.S. Cl. .................................... 358/302; 358/286; 358/293
[58] Field of Search ............................ 346/108, 76 L; 340/173 LM; 358/109, 113, 129, 285, 286, 300, 302, 293

[56] References Cited

U.S. PATENT DOCUMENTS

| | | | |
|---|---|---|---|
| 2,877,298 | 3/1959 | Hell | 358/287 |
| 3,287,736 | 11/1966 | Germer | 358/129 |
| 3,316,348 | 4/1967 | Hofnagel | 358/109 |
| 3,465,352 | 9/1969 | Carlson et al. | 346/108 |
| 3,493,754 | 2/1970 | Black | 358/113 |
| 3,720,785 | 3/1973 | Van Auken | 358/300 |
| 3,739,095 | 6/1973 | Alden | 358/285 |
| 3,751,587 | 8/1973 | Insler et al. | 358/286 |
| 3,798,365 | 3/1974 | Browning | 346/76 L |
| 3,800,076 | 3/1974 | Kolzumi | 358/300 |
| 3,816,652 | 6/1974 | Barnet | 358/294 |
| 3,836,709 | 9/1974 | Hutchison | 358/302 |

Primary Examiner—Michael A. Masinick
Attorney, Agent, or Firm—Flehr, Hohbach, Test, Albritton & Herbert

[57] ABSTRACT

Engraving apparatus with particular reference to a plate to be engraved having a photosensitive surface in which a write laser beam exposes anid surface by scanning the same in conjunction with a read optical path associated with a copy board positioned proximate the plate. Means, for example, such as a read laser beam scans the copy board, the reflection therefrom being noted and used to control the intensity of the write beam. The optical scanning elements of both the read optical path and the write beam are common to each so that positional error due to vibrations in the optical components is eliminated. Provision is made for read-right conversion to read-wrong during preparation of a plate, both by use of memory circuits and by geometrical arrangement. Independent width and length magnification, other than unity, are also provided.

3 Claims, 4 Drawing Figures

LASER READ-WRITE SYSTEM FOR THE PRODUCTION OF ENGRAVINGS

This is a continuation, of application Ser. No. 522,103, filed Nov. 8, 1974, now abandoned.

BACKGROUND OF THE INVENTION

This invention relates to engraving and more particularly to the sensing and reproduction of patterns on photosensitive surfaces, as in the production of printing plates.

Heretofore, the essential operations in the production of modern engravings have included photography by which material assembled on the copy board is illuminated by high intensity lamps and converted to a negative. The negative is then used to expose a photo-receptive printing plate, which is either composed of or coated with a photosensitive material. Examples of such photosensitive plates have been in the past of many kinds, some adapted particularly for relief printing, while others are adapted for intaglio (gravure) printing. The present invention will fine a wide variety of applications and, as will become apparent, the type of printing plate to be produced is not limited in the present invention, but may be of any usual type. In recent years, newspapers and commercial printing of various types have resorted to photo-composition and, particularly, in the utilization of printing plate materials based on photosensitive polymeric systems. A typical process consists of the direct exposure of a photopolymer layer carried on a suitable substrate to a negative prepared in the manner previously discussed, after which the exposed polymer layer and substrate are processed to selectively remove those portions which have not been exposed to develop the photo-engraved printing plate.

In certain systems, the negative is contact printed to the plate while in others it is imaged by a suitable lens and camera apparatus. While considerable progress has been made in the art of producing printing plates, it has still been required that such plates be produced from negatives generated by photographic processes. Although capable of producing plates of high quality, such processes require materials such as negatives and chemicals, expensive camera equipment, and numerous time consuming and costly operations to accomplish.

While there have been proposals for direct production of printing plates using a laser beam or electron beam for etching the same, the systems proposed have not been satisfactory due to problems such as inherent non-linearities of the optical system used for the sensing and etching operations, resulting in low resolution and low production. Such systems have also been unduly sensitive to small vibration resulting in degradation of image quality.

SUMMARY OF THE INVENTION AND OBJECTS

In general, it is an object of the present invention to provide a laser read-write system for the production of engravings on photosensitive surfaces which will overcome the above limitations and disadvantages and which will eliminate the need for the photographic step in the production of printing plates.

Another object of the invention is to provide a laser read-write system of the above character which is capable of reading any information capable of being assembled at the copy board, whether of printed letters or pictoral material, and directly translating the same into identical or corresponding information onto the surface of a photosensitive plate.

Another object of the invention is to provide a laser read-write system of the above character which is highly accurate, rapid, insensitive to vibration, and which can produce a linear, exact engraving of a copy board paste-up.

The foregoing general objects have been achieved in accordance with the present invention in which the copy board becomes an integral part of a laser scanning system consisting of an input laser beam which is focused down to a suitably small resolving spot upon a copy board. Means are provided for causing this spot to scan the copy board in a predetermined pattern, which may, for example, be similar to a raster-like scan. A sensing system is provided for receiving light reflected from the copy board at the position of impingement of the reading laser beam as it scans across the copy board surface. The output of the sensing system is used to control a modulator through which a second laser beam passes. The modulator is designed to control the amplitude or power of the second laser beam. Both the read laser beam and the write laser beam are passed through the same deflection optics and subsequently separated so that the read beam is passed to the copy board and the write beam is passed to the photosensitive surface. In this way, the beams are interlocked together and any irregularity in the movement of the scanning optics equally affects the read beam and the write beam.

These and other objects and features of the invention will become apparent from the following description when taken in conjunction with the accompanying drawings and claims.

DETAILED DESCRIPTION OF THE PREFERRED EMBODIMENTS

Figure 1:
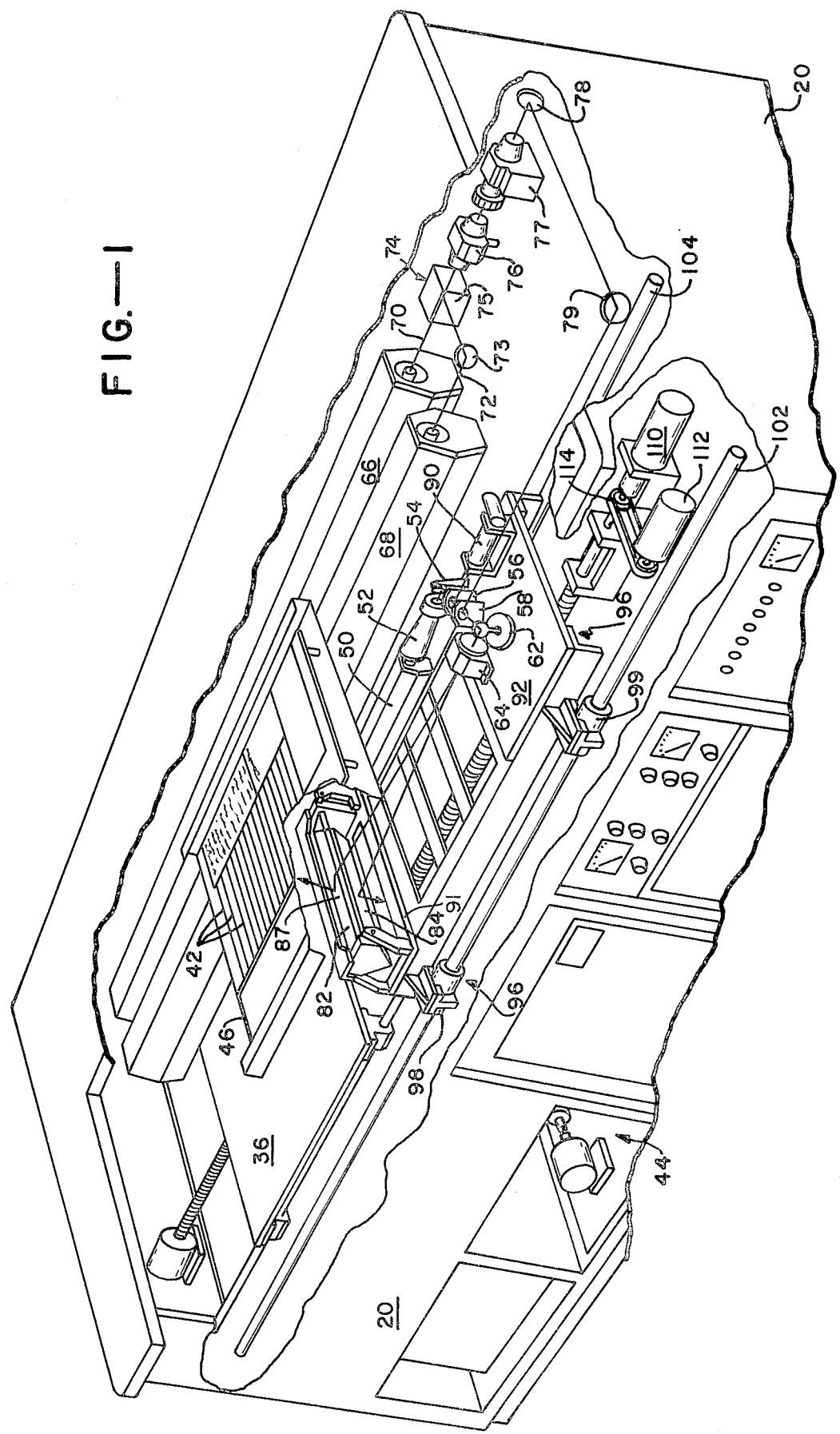
FIG. 1 is an isometric drawing, with the portions removed, illustrating a laser read-write system constructed in accordance with the present invention.
Figure 2:
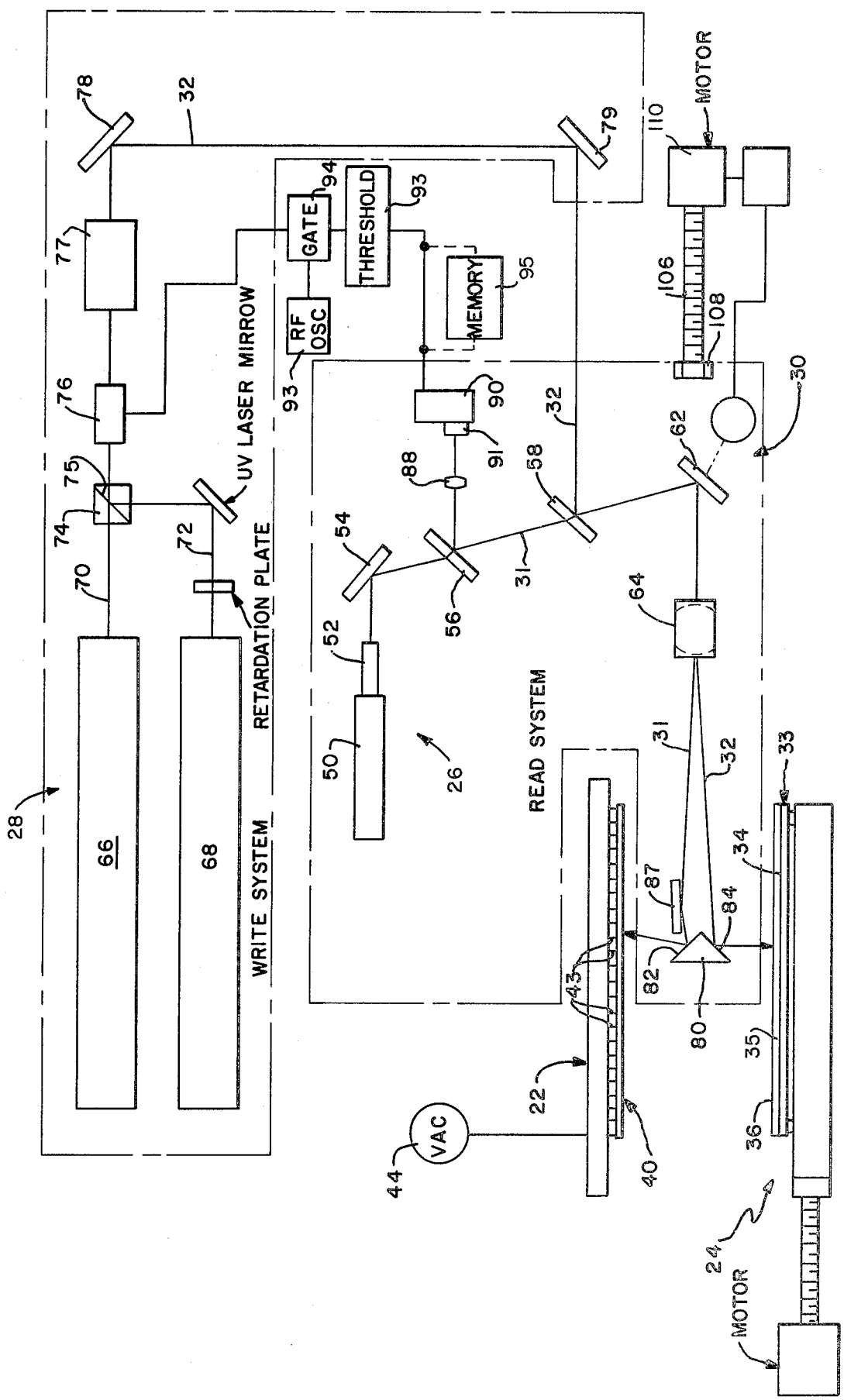
FIG. 2 is an optical schematic of the apparatus of FIG. 1.

Referring now more particularly to FIGS. 1 and 2, the major elements of the laser read-write apparatus of the present invention are shown supported as sub-systems in a suitable framework 20. These sub-systems include copy board support 22 and photosensitive plate 24, a read optical sub-system 26, a write laser beam sub-system 28, and a scan optical sub-system 30 providing a common optical path for receiving and scanning both a read optical system input and/or output beam 31, and a write laser beam 32 across respective ones of the copy board 22 and photosensitive plate 24. Each of these sub-systems will now be described in detail, after which the operation of the entire apparatus will be set forth.

Means is provided for supporting a photosensitive plate 35 at one end of the framework. It can, for example, consist of any suitable mounting structure, such as a flat plate 33 having an upwardly facing support surface indicated at 34, underlying the photosensitive plate. In one application, photosensitive plates can be made of aluminum and have a photosensitive polymer layer 36 applied to one surface thereof which is polymerized upon application of radiation of a suitable chromatic range and intensity.

Means 22 is provided for supporting a copy board 40 in a plane spaced parallel to and located above the photosensitive plate and can consist of any suitable support means, as for example, a plate having grooves 43 therein connected through a plurality of channels (not shown) to a vacuum pump 44 so that application of a paste-up thereto permits the same to be rigidly and uniformly supported when positioned face down over the photosensitive plate. The copy board holder is supported on a suitable hinge means 46 for permitting the same to be opened and closed in relation to the apparatus as a whole.

A read optical sub-system 26 consists of a helium-neon laser 50, the output of which is taken through a beam expander 52, a beam routing mirror 54 and reverse beam splitter 56 to a beam combiner 58 serving as the input to the scanning optical sub-system 30. The scanning sub-system 30 includes a galvanometer mirror 62 or other means for causing the input beams impinging thereon to scan laterally across the width of the copy board and photosensitive plate. The output of the galvanometer mirror 62 is passed through a scanning objective lens 64 which brings the beams passed therethrough into focus approximately at the copy board or photosensitive plate, as will be described.

The write laser sub-system 28 consists of lasers 66,68 capable of developing high power UV beams 70,72. The output beams of each of the laser are combined by causing the respective outputs to be cross-polarized with respect to the other. The combination is accomplished by passing the beams of each polarization through a polarization sensitive beam combiner 74 which is transparent from one side to radiation of one polarization direction and reflective by virtue of a diagonally positioned inner surface 75 having a multi-layered dielectric coating which is reflective to light of the cross-polarization as in beam 72. In this way, substantially all of the light from the UV lasers is combined with high efficiency. To effect the foregoing, the output of one of the lasers is rotated by either physically mounting that laser at 90° to the other or by incorporating a quarter wave polarizer (not shown) which retards the phase of the light from one of the lasers by 90°, i.e., effectively rotating the polarization by that amount. The combined energy of the UV lasers is then passed from the polarization beam combiner 74 through an optical modulator 76 either of an electro-optical or acousto-optical type. Examples include Zenith M70 (acousto-optical); Datalite DLM 1-UV (acousto-optical); Coherent Associates (electro-optical). Assuming the modulator to be acoustical, it is manufactured with coatings optimized for transmission in the ultraviolet region so as to be selectively transmissive to light of that frequency depending upon the application of an electrical control signal. A function of the acoustical optical modulator is to pass a light beam through a sound wave generated in a transparent material, the sound wave diffracting part or all of the energy in the UV light beam off at an angle so as not to enter the remainder of the optical system. This results in the capability of effectively turning the write beam completely off or completely on with respect to the remainder of the system in response to an applied electrical signal. When undeflected, the write laser beam 32 passes through the remainder of the optical system by traversing a beam expander 77 which enlarges the beam to 35 mm. and collimates it after which the beam is directed to the scanning optical system 30 by turning mirrors 78, 79.

The scanning optical system 30 includes beam combiner 58 comprising a first surface dichroic mirror which is transmissive for through transmission of the helium-neon beam impinging on its back surface and highly reflective as to UV radiation impinging on its first or front surface. Thus, each of the beams is redirected in near coincidence from the combiner 58 to the galvanometer mirror 62 and the scanning objective lens 64. In that connection, the routing mirror 54 of the read optical system is oriented so as to direct the helium-neon beam upwardly at a small angle ($\sim 1°$) with respect to the horizontal center line of the scanning optical system. The dichroic mirror surface of combiner 58 is oriented so as to direct the UV radiation downwardly at a small angle ($\sim 1°$) with respect to the horizontal center line of the scanning optical system. In this way, beams 31,32 are vertically diverging as they pass from the scan objective lens toward the copy board and photosensitive plate, although still lying in a single vertical plane. When the beams have diverged from each other by about 1 to 2 inches, they are intercepted by dihedral mirror prism 80 having an upper surface 82 inclined upwardly at an angle of approximately 45° to the center line of the scanning system so as to deflect the read beam 31 upwardly to the copy board. Mirror 87 also has a lower surface 84 inclined downwardly an angle of approximately 45° so as to deflect the write beam 32 to the photosensitive plate. The dihedral mirror is provided with suitable surface coatings to maximize these reflections. Suitable coatings include an aluminum coating on upper surface 82 and a multi-layer dielectric coating maximized for UV reflection on lower surface 84.

It will be noted that any vibration in the galvanometer mirror system or in the relationship of the optical components will result in the combined beams being shifted upwardly or downwardly together which results in such movement causing the beams to move out of phase, i.e., generally upward motion causes the write beam 32 to move to the right while the read beam 31 moves to the left. In order to maintain the beams in synchronism so that they move in the same direction upon any vibration, an anti-vibration optic 87 is incorporated and consists of a planar reflecting surface, such as an aluminum mirror, mounted by suitable means in the path of the read beam so as to cause a reflection thereof on route to the dihedral mirror. In this way, movement of the beams upwardly causes equal translation of both beams apart from each other or towards each other an equal amount as they impinge the dihedral mirror surfaces and, therefore, causes any vibration in each beam to be in phase and cause equal translation at each of said surfaces.

The read optical sub-system 26 also includes means for retrodirectively viewing a small spot on the copy board. This means includes a read lens 88 positioned to receive light from beam splitter 56 and focus the same to a spot on a photo-multiplier tube 90. The output of the photo-multiplier tube is sensed and used to provide an electrical signal for operating modulator 76. In many applications it will be desirable to position a spatial filter 91 before the photo-multiplier tube so as to define a very small spot on a copy board which can be viewed at any particular moment.

Means is provided for moving the scan optical subsystem and comprises of suitable mounting plates 91,92 carried on a sub-carriage 96 which is supported on suitable bearings 98,99, such as ball bushing bearings running on rods 102,104 which, for example, have been manufactured by centerless grinding. Carriage 96 supports the entire read optical sub-system 26, as well as the entire scanning optical sub-system for translatory movement back and forth towards and away from the copy board and photosensitive plate. A suitable drive screw 106 is connected to a nut 108 carried on a lower side of the carriage approximately beneath the objective lens. Screw 106 is rotated by a stepping motor 110 so that after each scan of the mirror 62 across the field, the stepping motor is advanced one increment, as will be described. A second motor 112, which is normally disengaged, is provided for rapid return of the carriage after completion of each scan sequence. Motor 112 operates through a uni-directional coupling 114. The operation of the device will now be set forth, together with certain additional details of the system.

In operation, the copy board 22 is opended and a paste-up mounted by vacuum directly over and opposite to the printing plate 36. At the start of the scan sequence, the moving carriage is advanced until a point where the dihedral mirror 80 is directly between the beginning of the paste-up on the copy board and the beginning of the printing plate. At this point, the operator can visually perceive the red helium-neon line being scanned across the start of the paste-up copy. The carriage 96 is driven forward by motor 110 and screw 106 at a rate corresponding to one-half of a blur circle diameter per scan. A blur circle in the present instrument is approximately 1-3 mils in diameter and represents the smallest practical resolved spot achieved with this optical system. The galvanometer mirror 62 scans in both directions during operation. At the end of each scan, the entire carriage 96 supporting the read-write system and scanning system is advanced. As the read beam scans across the copy, the small read dot produced by the read beam will be about two mils in diameter and crosses areas which are alternately dark or light. The dark areas may be typing, line art, photographs suitably half-toned screened, or any conventional subject matter usual for incorporation in paste-up. The amount of light reflected by the copy changes markedly as a function of the reflectivity density of the paste-up, the dark areas reflecting very little, and the light areas reflecting significantly. It will be noted that the impingement of the read beam upon the copy board is arranged to be at an angle so that specular reflection is avoided. In this way, reflected light can be sensed retrodirectively without specular reflection by the same optical system which is transmitting the read beam. The non-specular reflection is received by the objectve lens, reflected off the scanning mirror 62, passed through beam combiner 58 and reflected off beam splitter 56 into the photomultiplier tube. Lens 88 preceding the tube serves to decollimate the energy and to bring it to a focus at the entrance slit of the photo-multiplier. If desired, spatial filter 91 may be incorporated at the entrance slit of the photo-multiplier to achieve greater resolution by excluding stray reflections and unwanted light. The photo-multiplier tube senses the change in reflected light energy as the dot scans across the light and dark areas of the paste-up so that a varying signal is received. This signal is amplified and compared in a preset threshold 93 so that whenever the threshold is exceeded, an RF signal which is normally blocked by gate 94 will be passed from an oscillator 93 to modulator 76. If the signal from the photo-multiplier tube is less than the threshold level, it is then responsive to a dark scanning area and thereby turns the modulator on so as to deviate the write laser beam. As has been set forth in the previous description, as the read system dot is scanning across the paste-up, the ultraviolet write laser beam 32 is simultaneously scanned across the printing plate to be exposed. In general, the beams are vertically coplanar but divergent within the plane by about 2° to 5° to permit and separate reflection upwardly and downwardly at mirror 80. After being deflected by the scanning galvanometer mirror, both the beams are focused by the objective lens. This lens is a flat field lens covering an angle of about 25° and is designed to operate at near diffraction limit resolution. The objective lens brings each of the beams to a sharp focus at approximately the respective copy board or photosensitive plane. Thus, as the read beam crosses each dark area of the paste-up, the ultraviolet beam is simultaneously exposing a segment of the photosensitive plate. This exposed area then becomes an area of type which will transfer ink to a newspaper page, for example, in normal printing.

In many applications, particularly in the newspaper printing trade, it is desirable to obtain image demagnification of a slight amount between the paste-up at the copy board and the plate being prepared. Such image demagnification is desired in a range of from 0 to 10% in width and up to 3% in length and is directly achievable with the apparatus of the present invention. Width magnification is controlled by the distance from the scan objective to the respective plane. If the distance between the scan objective 64 and the plate surface 34 is decreased, width demagnification will occur. Changes in length magnification are achieved in accordance with the present invention by providing a carriage running on ball bushings set on rails or rods supported in the framework and upon which the plate to be prepared rests. This carriage is slowly driven by a screw and ball nut arrangement similar to that previously described in connection with carriage 96. Obviously, the driving speed of the foregoing arrangement is arranged to be a percentage of the driving speed of carriage 96 in the same proportion as the desired change in magnification.

It also may be desired that the plate be prepared in read-right relationship rather than read-wrong relationship in accordance with the printing practice being utilized. This is accomplished by incorporating a memory 95 in the circuit controlling modulator 76 and in the signal path from the photo-multiplier tube to the threshold, which memory is required to store the entire information contained in a single width scan of the read beam and read it out in reverse order in the adjacent scan of the write beam 32.

Many changes and modifications of the present invention are to be understood as incorporated within the general concept thereof, of which mention of a few will now be made, and after which an example of a substantially different system will be set forth in detail in conjunction with an alternative embodiment of the invention incorporating many of the alternatives suggested. In the present system, the horizontal scanner is shown as a galvanometer mirror which oscillates about a vertical axis. Such a mirror has inherent high efficiency since it provides for read and write function in both directions, and, therefore, its duty cycle time is quite high. However, such a mirror could be replaced by a multi-faceted rotating mirror or polygon mirror. If the resolution requirements are not unduly strict, it would be possible to substitute the electro-optical deflector in the write beam circuit as previously suggested. Alternatively, an oscillating mirror operated by a tuning fork system could be utilized.

In the read system, the method of sensing the reflected light from the paste-up is variable. In the system just described, retrodirective sensing is utilized. However, the light reflected from the paste-up could be sensed by a fiber-optic array positioned across the entire scan line and above the dihedral mirror. Such a fiber-optic array could consist of a line of fibers facing the scan line at the point of focus of the read laser beam. This line of fibers picks up any reflected light from any position along the scan line after which the fibers can be bundled together to collect any light along this line into a narrow bundle and pass the light to a detector in a manner similar to that disclosed herein.

It is also possible to sense the copy by general illumination, utilizing the system exactly as shown, except that in place of a read beam, the paste-up copy can be generally illuminated by a non-actinic lamp system, a pin hole being used as a spatial filter at the photo-multiplier tube entrance slit to determine the resolution of the read system. This, in a sense, amounts to establishing a passive read beam which is scanned by the optics. However, it will be found that by using a read laser as disclosed hereinbefore, the retrodirective system becomes relatively immune to ambient light and by utilizing a spatial filter, it is possible to eliminate almost all stray light from the read system. The advantage of a fiber-optic sensing system is that a higher signal to noise ratio is obtained, but at the sacrifice of greater sensitivity to ambient light. In a passive system using a lamp generally illumined system, the optical alignment of the device is not critical, but it is more difficult to obtain a good signal to noise ratio.

In the present system, it is noted that the output as developed on the printing plate in the opposite from the input and, therefore, is termed as a read-wrong system. Should a read-right syste be desired, there are several possibilities. One, is that a small memory can be incorporated in the circuit so that an inversion can be obtained by scanning a line ahead, remembering the line in a suitable memory bank, and reading it out in reverse order. Where the scanning mirror system operates in both directions as shown, each line need only be read out in the subsequent scan. The geometry of the system just disclosed has the read and write surfaces arranged opposed to each other. An alternative arrangement could be provided in which the planes to be scanned both in read and write are arranged side by side or in tandem. A system designed with many of the alternative measures just discussed will now be described.

Figure 3:
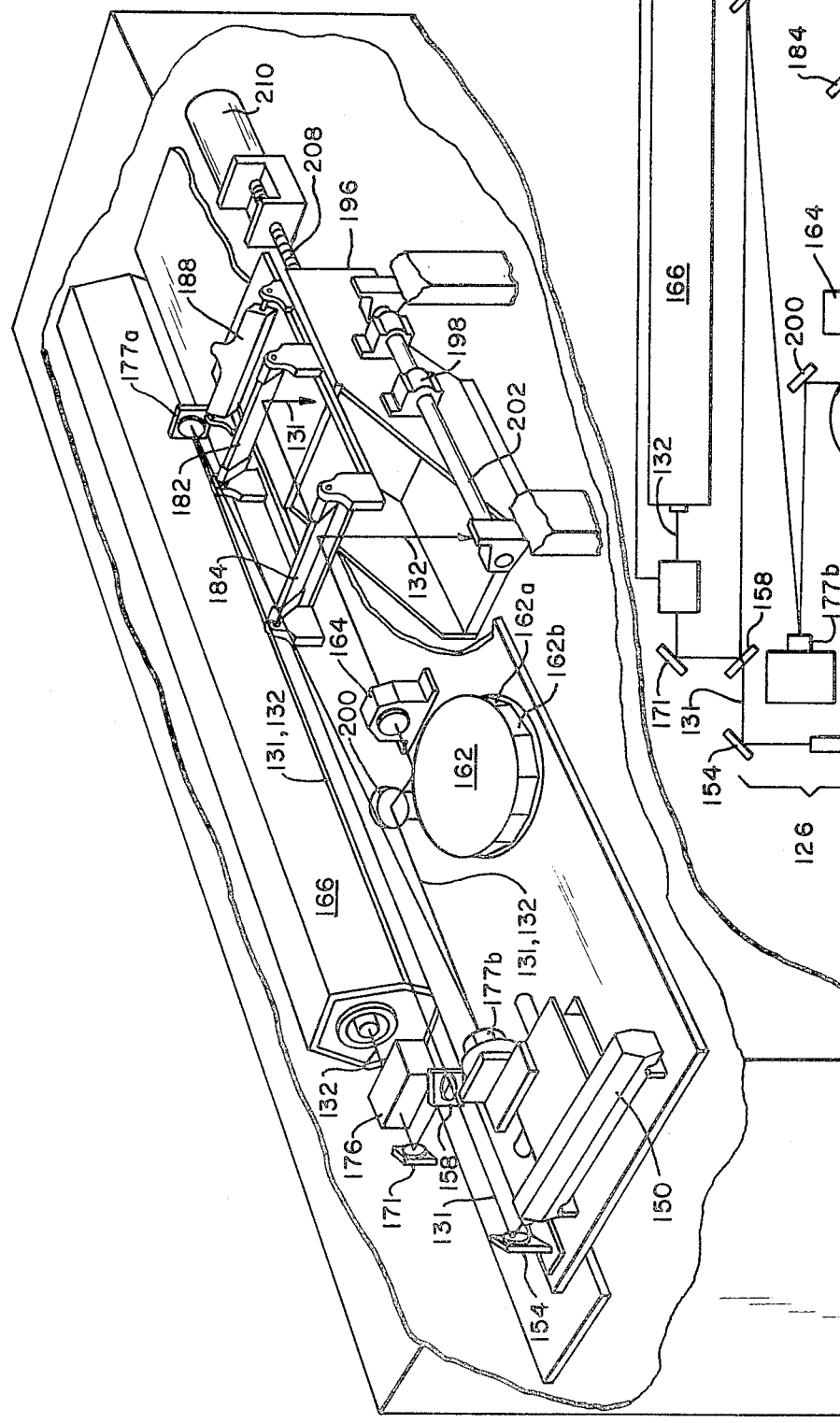
FIG. 3 is an isometric drawing of another embodiment of a laser read-write system, with portions removed, constructed in accordance with the present invention.
Figure 4:
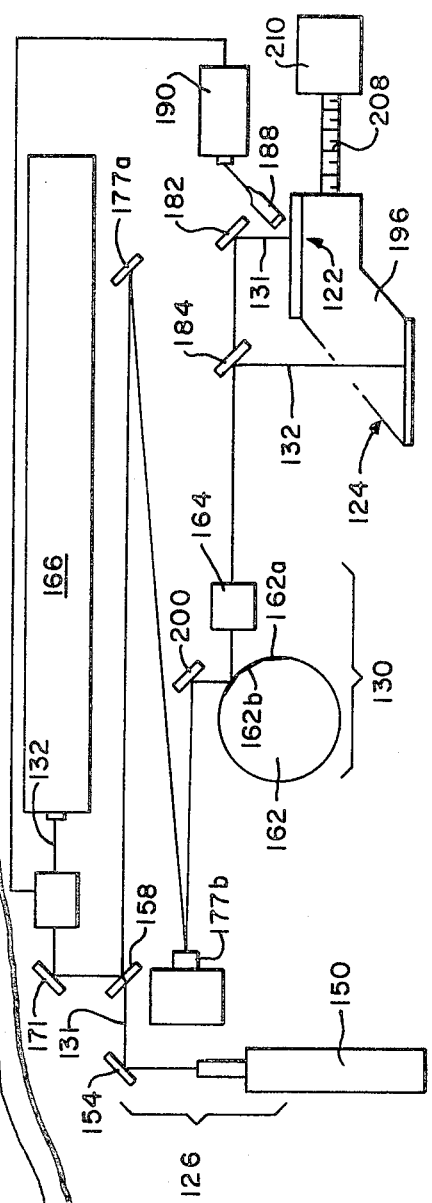
FIG. 4 is an optical schematic of the apparatus of FIG. 3.

Referring now to FIGS. 3 and 4, there is shown an alternative embodiment of the present invention which generally is supported within a suitable framework 120. In the following description, like parts will be given like numbers to those of FIGS. 1 and 2 elevated by one hundred to facilitate identification with respect to the previous embodiment. Thus, the system includes a copy board 122 and photosensitive plate 124, a read optical sub-system 126, a write laser beam sub-system 128 and a scan sub-system 130 providing a common optical path for receiving and scanning both the read optical system output beam 131 and a write laser beam 132 across respective ones of the copy board 122 and plate 124. The read optical system includes a helium-neon read laser 150, for example, which is imaged to a turning mirror 154 through a beam combiner 158 transmissive thereto. The output of a write laser 166 is taken through an intensity modulator 176, a turning mirror 171 and is reflected off a dichroic first surface of the beam combiner 158. Each of the beams is coincident and need not contain any veritical divergence. The beams are passed thence via a set of spherical mirrors 177a, 117b which serve as a beam expander. After being reflected from an additional turning mirror 200, the beams are coincident and collimated to an appropriate diameter. They are then scanned and reflected off of successive mirror surfaces of a cylindrical drum 162 carrying a plurality of plane mirror surfaces 162a, 162b thereon arranged in a polygonal fashion and through an objective lens. The objective lens 164 brings the beams to focus at the surfaces of the respective plate as hereinbefore described.

A sub-frame 196 is provided for carrying copy board 122 and the plate 124 in generally in-line relation to each other with respect to the beams 131,132. A first dichroic beam splitter 184 serves as a UV scanning mirror by reflecting the ultraviolet energy of the write laser beam 132 downwardly toward the surface of the plate 124, while permitting the read beam 131 to pass to a second scanning mirror 182 which redirects it downwardly to impinge upon the paste-up at the copy board. The optical distances from the scanning polygon to the respective plate or copy board are arranged to be approximately the same in order to maintain unity image magnification. The non-specular reflected output from the paste-up is received by a fiber-optic array 188 which is positioned at an angle and aimed toward the line of scan immediately below the scanning mirror. The fiber-optic array is arranged in a linear fashion as a line-to-point converter so that all possible reflective elements of the paste-up scan are being seen simultaneously. The array is then regrouped into a small spot serving as the input to photo-multiplier tube 190 which in turn controls the intensity permitted to be passed by modulator 176.

The paste-up and copy board are mounted in sub-frame 196 carried on ball bushings 198 set on rods 202 and driven by screw 208 motor rotated so that the scanning proceeds as increments as heretobefore described.

Since the read and write beams are both directed in the same direction, the resultant pattern reproduced on the photosensitive plate will be in read-write relation to the paste-up and, therefore, the resultant engraving is directly usable for offset printing. Additionally, since the beams are deflected by the scanning optics in the same direction, there will be no necessity for anti-vibration optics.

While there has been disclosed herein a copy board supported paste-up which it is desired to reproduce, it is desirable to point out that the same apparatus and procedure can be used for positional informational encoding, such as required in facsimile transmissions. In such an apparatus, the paste-up becomes a grid or other position indicating network which when scanned by the read beam generates output pulses which are counted in an up-down counter to generate a binary member corresponding to the position of the read beam. Since the read beam is optically interlocked to the write beam, this member provides the accurate positional data required for high-quality data transmission.

I claim:

1. In a system for forming an image of an object on a writing surface: means for producing a reading beam and a writing beam for scanning of the object and the writing surface respectively, modulator means for varying the intensity of the writing beam, beam combiner means for directing the reading beam and the modulated writing beam generally together with a small divergence along a common path, beam separator means including a deflector positioned between the diverging beams with first and second surfaces for reflecting the respective beams toward the object and the writing surface, a reflector for reflecting one of the diverging beams back toward the other before the beams impinge upon the surfaces of the deflector, scanning means positioned along the common path for diverting the combined beams across a predetermined portion of the path to effect synchronous scanning of the object and the writing surface by the separated beams, and means responsive to energy received from the object as it is scanned by the reading beam for conditioning the modulator means to vary the intensity of the writing beam to form an image of the object on the writing surface.

2. The system of claim 1 further including mounting means permitting positional adjustment of the writing surface relative to the object, such adjustment determining the relative sizes of the image and the object.

3. The system of claim 1 wherein the means for conditioning the modulator means to vary the intensity of the writing beam includes a memory for storing data corresponding to the energy received from the object as it is scanned by the writing beam.

* * * * *